(12) United States Patent
Miyawaki

(10) Patent No.: US 6,683,657 B1
(45) Date of Patent: Jan. 27, 2004

(54) PROJECTION DISPLAY DEVICE AND APPLICATION SYSTEM OF SAME

(75) Inventor: Mamoru Miyawaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 332 days.

(21) Appl. No.: 09/669,694

(22) Filed: Sep. 26, 2000

(30) Foreign Application Priority Data

Sep. 29, 1999 (JP) .......................................... 11-277034

(51) Int. Cl.[7] ................................................. H04N 9/30
(52) U.S. Cl. ......................... 348/743; 348/759; 348/771
(58) Field of Search ................................. 348/744, 756, 348/757, 750, 751, 743, 771, 742, 759, 761, 762, 767, 687, 678; 353/85; H04N 9/30

(56) References Cited

U.S. PATENT DOCUMENTS 5,379,083 A * 1/1995 Tomita ........................ 353/122
5,467,146 A * 11/1995 Huang et al. ................ 348/743
5,592,188 A   1/1997 Doherty et al. ............... 345/84
6,259,430 B1 * 7/2001 Riddle et al. ................ 345/589

FOREIGN PATENT DOCUMENTS

JP          10-78550         3/1998

* cited by examiner

Primary Examiner—Michael H. Lee
(74) Attorney, Agent, or Firm—Fitzpatrick, Cella, Harper & Scinto

(57) ABSTRACT

A projection display device has a large dynamic range in addition to a large-sized screen and high definition. In a projection display device for projecting an image formed by an optical modulator to display the image, an illumination-light amount modulating unit for adjusting an amount of light illuminated to the optical modulator is provided between a light source for illuminating the optical modulator and the optical modulator.

59 Claims, 12 Drawing Sheets

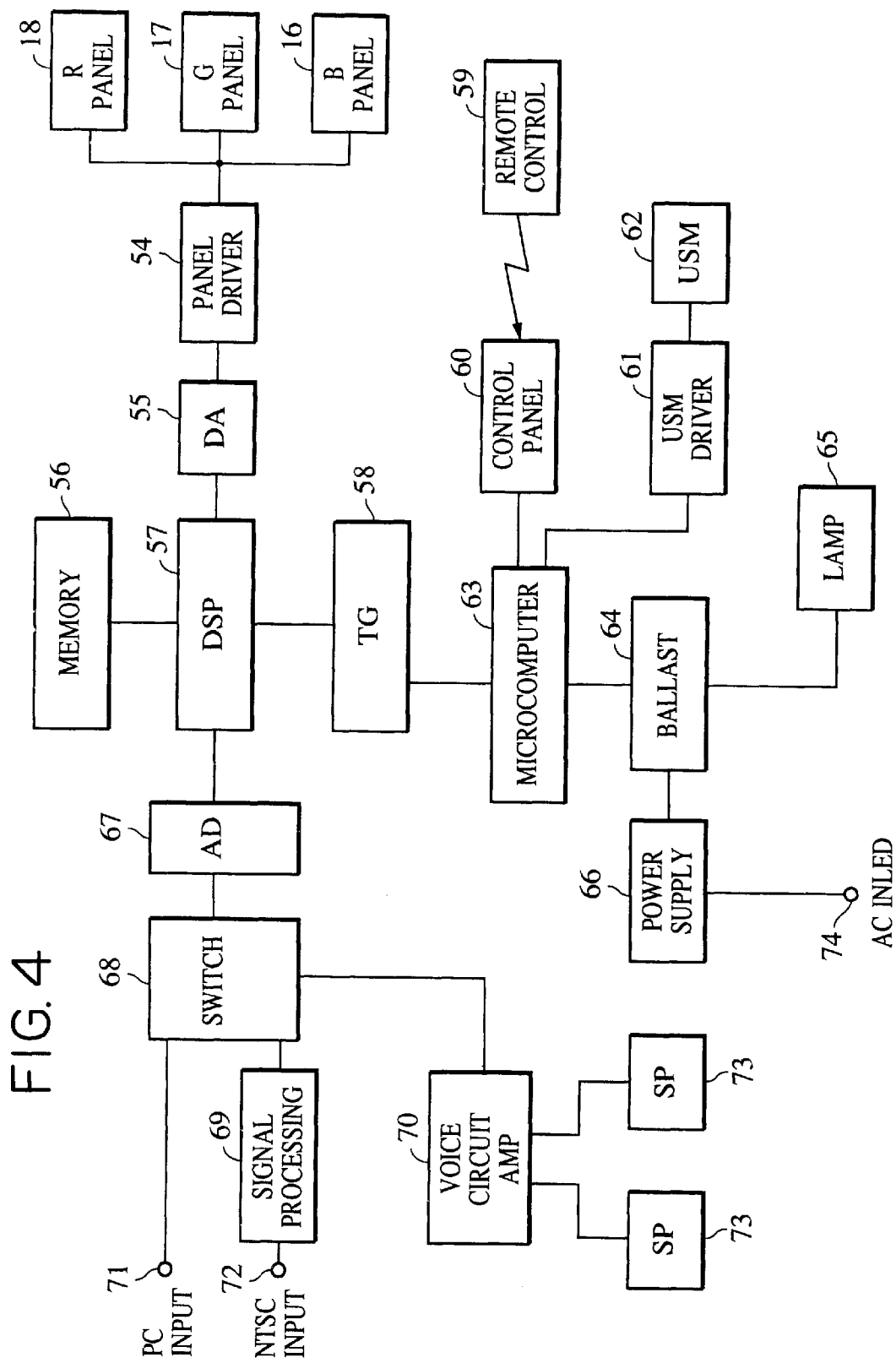

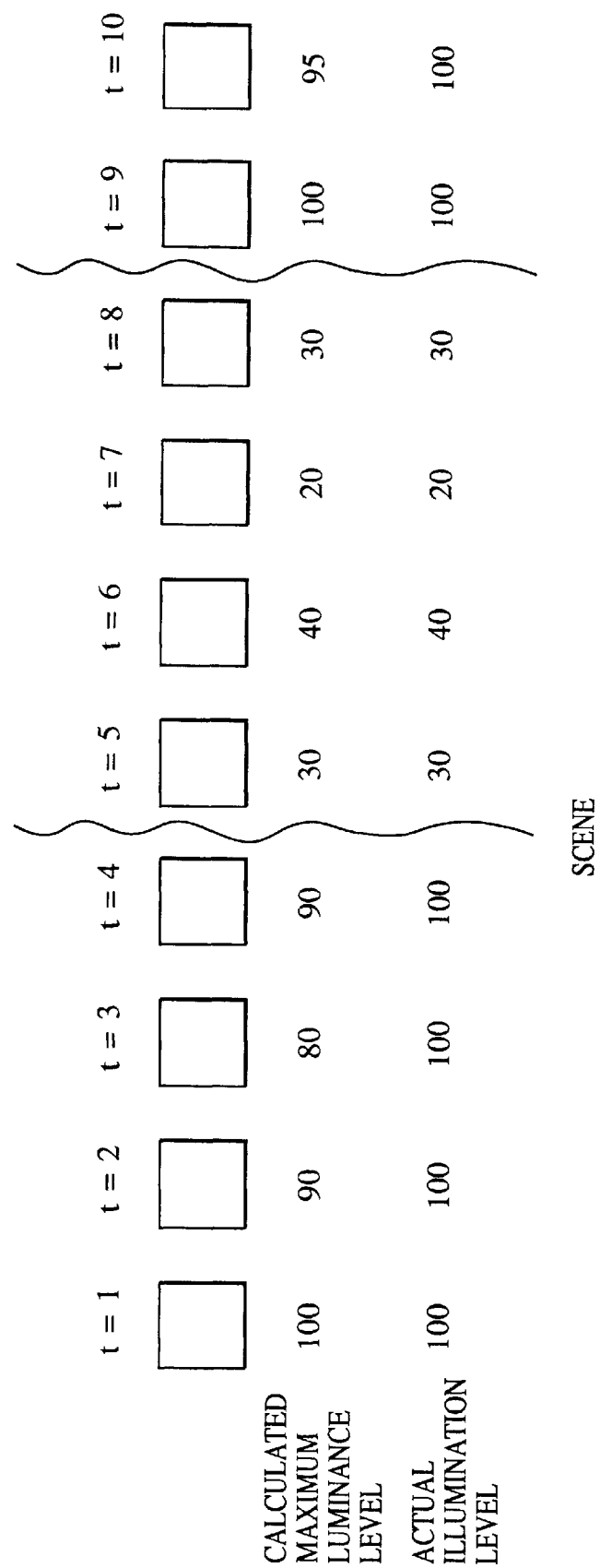

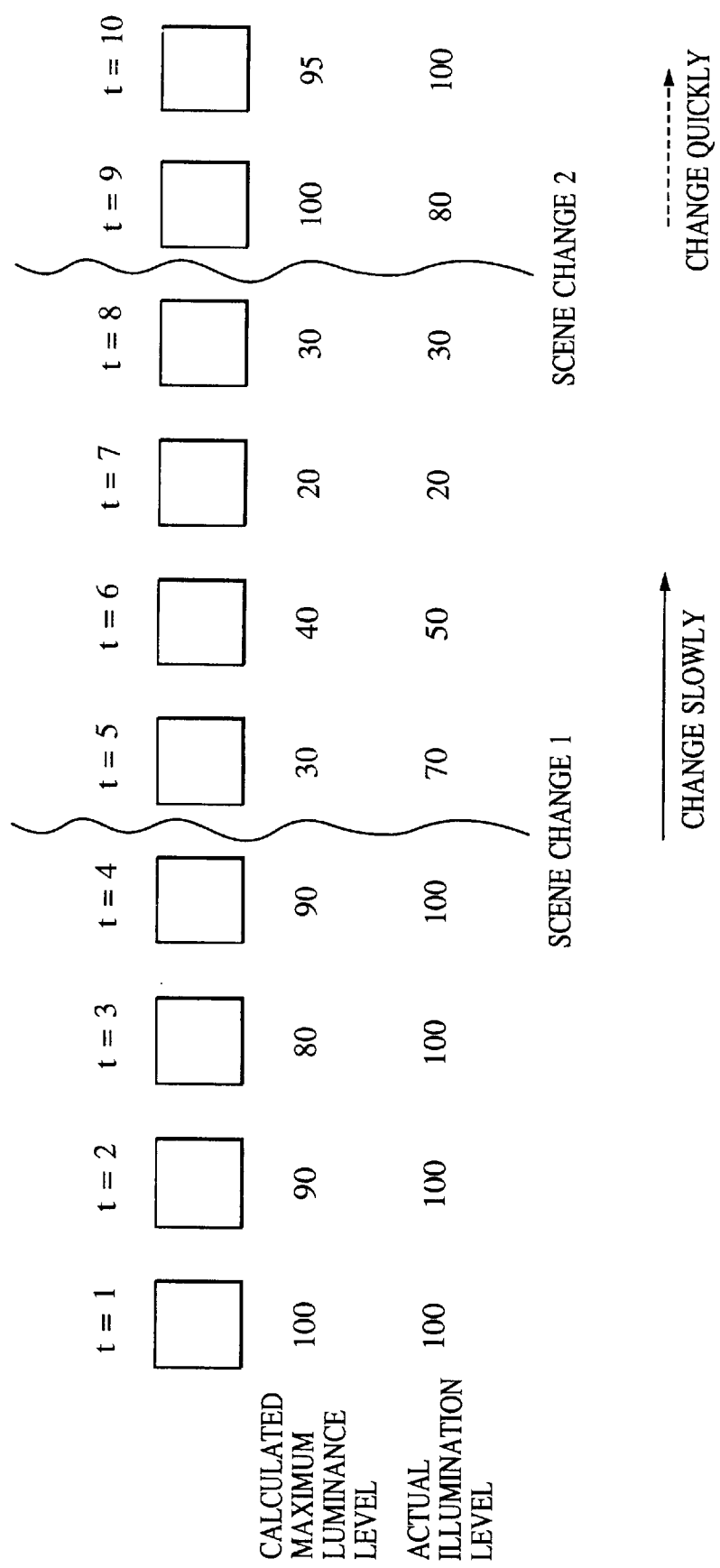

PROJECTION DISPLAY DEVICE AND APPLICATION SYSTEM OF SAME

BACKGROUND OF THE INVENTION

1. Field of the Invention

The present invention relates to a projection display device.

2. Description of the Related Art

With the arrival of a multimedia era, the use of display devices has become popular more and more in every field. Particularly, a projection display device is a notable one because the projection type is more efficient in realizing a large-sized screen than other types. Front projectors are becoming pervasive in presentations, for example, and rear projectors are becoming pervasive as home theaters.

Recently, projectors of the type utilizing, instead of CRT projection, a liquid crystal panel or a DMD (Digital Mirror Device, see, e.g., Japanese Patent Laid-Open No. 10-78550), which modulates the amount of light by changing a mirror angle, have come into widespread use because they are suitable for high luminance and high definition.

However, those projection display devices are inferior in image quality to commonly used direct-view-type CRTs. For this reason, when users desire high-quality display (i.e., display representing an image with a greater depth in color quality), direct-view-type CRTs are employed in many cases even though the screen size is comparatively small. The term "high image quality (depth in image quality)" used herein means that a display device has a large dynamic range (i.e., the device is able to display an image with high contrast and many-levels of gradation). Because of an ability of modulating the luminance in accordance with, e.g., the intensity of an electron beam, a CRT can realize a dynamic range of about 1000:1, for example, when only a particular area (partial area) is displayed in white. Accordingly, the CRT has the potential to display a white image whiter and a black image blacker, and hence realizes excellent image quality. The CRT, however, has a problem that an available screen size is about 40 inches at maximum due to, e.g., a limit in tube size and a greater screen size is difficult to achieve from the technical point of view.

On the other hand, when applied to projection display devices, the CRT type is disadvantageous in the engine size, brightness, and definition. For this reason, as mentioned above, the liquid crystal type and the DMD type suitable for high luminance and high definition have become prevalent in recent years. In those types of display devices, a liquid crystal device or a DMD serves as an optical modulator for modulating a beam of light. A light beam from a lamp is illuminated to the liquid crystal device or the DMD, and a light image is projected onto a screen in an enlarged size through a projection optical system. Therefore, a dynamic range of the projection display device is primarily determined by the dynamic range specific to the liquid crystal device or the DMD.

A practical dynamic range is about 300–400:1 for the liquid crystal device and about 500–600:1 for the DMD. Thus, display devices of the liquid crystal type and the DMD type have a problem that they cannot surpass a display device of the CRT type in only one point of high image quality (large dynamic range).

SUMMARY OF THE INVENTION

Accordingly, it is an object of the present invention to provide a system capable of realizing a projection display device which has high image quality (large dynamic range) in addition to its own specific features, i.e., a large-sized screen and high definition.

Furthermore, the system is inexpensive and practical because the above object is achieved by the system based on a combination with an existing device in the state of the art, such as a liquid crystal device and a DMD.

To achieve the above object, according to a projection display device of the present invention, between a light source and an optical modulator (liquid crystal device or DMD), there is provided a unit for adjusting an amount of light illuminated to the optical modulator (illumination-light amount modulating unit). Also, a projection display system of the present invention comprises the projection display device, a circuit for processing a signal applied to the optical modulator in accordance with the amount of illumination light, and a unit for writing the signal in the optical modulator.

With the present invention, since the illumination-light amount modulating unit is provided between the light source and the optical modulator, it is possible to illuminate a dark screen image with a reduced amount of light and a bright screen image with an increased amount of light. Consequently, a larger dynamic range than in the case of illuminating the optical modulator with a constant amount of light can be realized.

Further objects, features and advantages of the present invention will become apparent from the following description of the preferred embodiments (with reference to the attached drawings).

BRIEF DESCRIPTION OF THE DRAWINGS

FIG. 4 is a block diagram showing the construction of an electrical system of the projector shown in FIG. 1;

FIG. 6 is a representation for explaining one example of the relationship between a maximum luminance level, which is calculated for some image data changing over time in the projector of FIG. 1, and a corresponding level for the amount of illumination light;

FIG. 7 is a representation for explaining another example of the relationship between a maximum luminance level, which is calculated for the image, and a corresponding level for the amount of illumination light;

DESCRIPTION OF THE PREFERRED EMBODIMENTS

Hereinafter, several embodiments of the present invention will be described with reference to the drawings.

First Embodiment

A first embodiment of the present invention will be described below.

Figure 1:
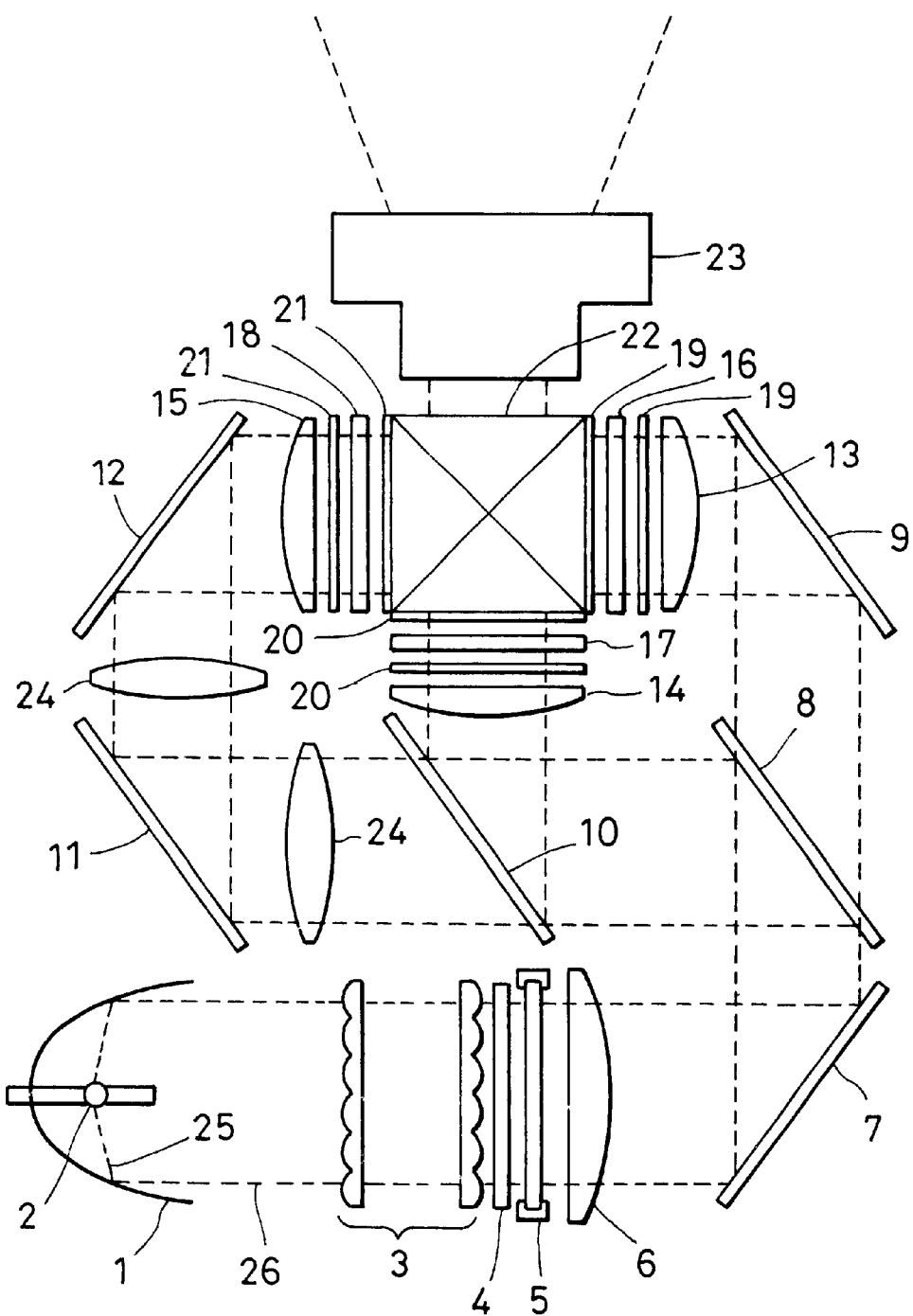
FIG. 1 is a diagram showing the construction of an optical system of a liquid crystal projector according to a first embodiment of the present invention.

FIG. 1 is a diagram showing the construction of an optical system of a liquid crystal projector according to the first embodiment of the present invention. Numeral 1 denotes a reflector for a lamp, and 2 denotes a light emitting tube (lamp). Numeral 3 denotes a fly's-eye integrator, i.e., a compound-eye focusing lens. Numeral 4 denotes a PS converter in the form of an optical device, and 5 denotes an illumination-light amount modulator. The illumination-light amount modulator 5 in the form of an optical device is constituted by attaching a phase plate or a polarizing plate to an ultrasonic motor. The optical system further comprises relay lenses 6, 24, mirrors 7, 9, 11, 12, dichroic mirrors 8, 10, field lenses 13, 14, 15, liquid crystal panels 16, 17, 18, polarizing plates 19, 20, 21, a cross prism 22, and a projection lens 23.

The principle of modulating the amount of light illuminated to the liquid crystal panels 16, 17, 18 will now be described with reference to FIG. 1. A light beam 25 emitted from the lamp 2 is reflected by the reflector 1 to become a parallel light beam 26. In this embodiment, the reflector 1 has a parabolic shape for conversion into the parallel light beam 26. It is however a matter of course that the reflector 1 may have an elliptic shape for conversion into a condensed light beam. The light beam 26 enters the fly's-eye integrator 3. Each lens area of a fly's-eye lens 3a on the entrance side is in a conjugate relation to each of the liquid crystal panels. The integrator 3 functions to make uniform not only a distribution of the light beam emitted from the lamp 2, but also a color distribution for each light emitting area of the lamp 2.

The light beam outgoing from the integrator 3 is a non-polarized light beam which is then converted into a linearly-polarized light beam by the PS converter 4. The PS converter 4 can be constituted by, e.g., a combination of a polarizing beam splitter and a ½-wavelength plate. With this arrangement, a ratio of P- to S-polarized light over 20:1 was obtained without difficulties.

The linearly-polarized light beam passes an optical device 5 comprising a polarizing plate or a phase plate that is continuously rotatable, whereby the amount of light illuminated to the liquid crystal panels is continuously changed.

In the case of employing a polarizing plate as the optical device 5, when the polarizing direction of the linearly-polarized light beam having passed the PS converter 4 is parallel to the polarizer-orienting direction of the polarizing plate, the linearly-polarized light beam passes the polarizing plate in amount (about 85%) except for a component of about 15% that is reflected from an absorbing surface of the polarizing plate.

By rotating the polarizing plate relative to the polarizing direction of the linearly-polarized light beam, the amount of light passing the polarizing plate can be continuously reduced because only a component of the incident light beam projected in the polarizer-orienting direction of the polarizing plate passes the polarizing plate. When the PS ratio of the linearly-polarized light beam entering the optical device 5 is 20:1, it was possible to reduce the amount of light illuminated to the liquid crystal panels down to 1/20.

As described above, the light beam having passed the PS converter 4 is converted into a linearly-polarized light beam (including partial conversion into a linearly-polarized light beam). Then, the amount of light illuminated to the liquid crystal panels can be changed by rotating the polarizing plate through which the linearly-polarized light beam passes. The polarizing plate may be arranged in any position downstream of the PS converter 4. However, if the polarizing plate is arranged in a position close to the light source, the amount of incident light would be so strong that properties of the polarizing plate itself are changed. For this reason, it is desired that the polarizing plate be arranged in a position relatively remote from the light source. Also, in the case that a difficulty arises in arranging the polarizing plate in a position relatively remote from the light source, resistance of the polarizing plate against light and heat can be increased by using a sapphire-made polarizing plate.

The polarizing plate is rotated by an ultrasonic motor (USM). The ultrasonic motor is suitable for adjustment of the light amount intended by the present invention because it can rotate at a high speed and its rotation angle can be regulated with good controllability.

The rotating speed of the ultrasonic motor can be sufficiently increased, though depending on a load torque, up to 1000–5000 rpm. When calculated in terms of the rotation angle of 90° (corresponding to change from white to black or vice versa), such a speed range means that the amount of illumination light can be changed in time of 3–15 ms. There rarely occurs a case that a video signal changes abruptly from white to black. Assuming that the light amount changes 10%, the rotation angle of the polarizing plate required to effect such a change of the light amount is 26°. In this case, the changing speed of the amount of illumination light is 1–5 ms that is faster than the response speed of a liquid crystal, i.e., 10–20 ms. The rotation angle of the motor can be controlled using an encoder attached to the motor. Rotation accuracy at a level of ±0.1° was obtained without difficulties.

In addition to an ultrasonic motor, a PC stepping motor may also be used as the motor, and can realize the speed and accuracy comparable to those of the ultrasonic motor.

With the above-described arrangement, a desired amount of illumination light, described later, is calculated from the video signal. A rotation angle of the polarizing plate necessary to realize the desired amount of illumination light is calculated, and the motor is rotated so as to provide the calculated rotation angle.

Another scheme for achieving a desired light amount by monitoring the amount of illumination light and performing servo control based on the monitored light amount will now be described with reference to FIG. 2. An optical system of FIG. 2 differs from that of FIG. 1 in replacing the mirror 7 by a half mirror 201, and adding a condensing lens 202 for condensing the light having passed the half mirror 201 and a light amount sensor 203 for detecting an amount of the condensed light. The half mirror 201 may be formed to substantially totally reflect the incident light such that a reflected component is 99% and a passing component is 1%. Thus, the amount of light illuminated to the liquid crystal panels is slightly reduced by the half mirror 201, but a resulting reduction of the light amount causes no problems.

A light beam having passed the half mirror 201 enters the light amount sensor 203 through the condensing lens 202.

Figure 2:
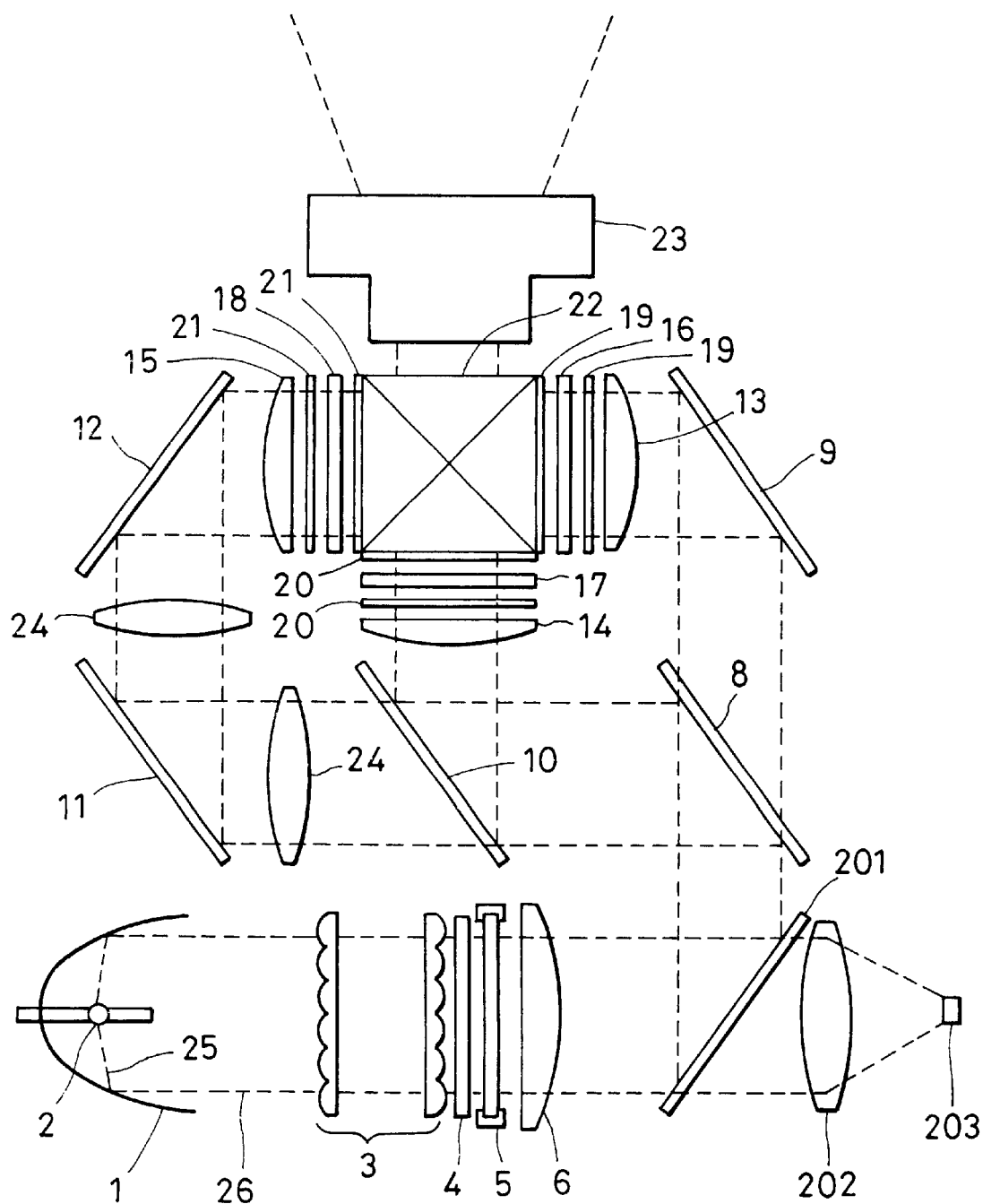
FIG. 2 is a diagram showing a modification of a light amount modulator shown in FIG. 1.
Figure 3:
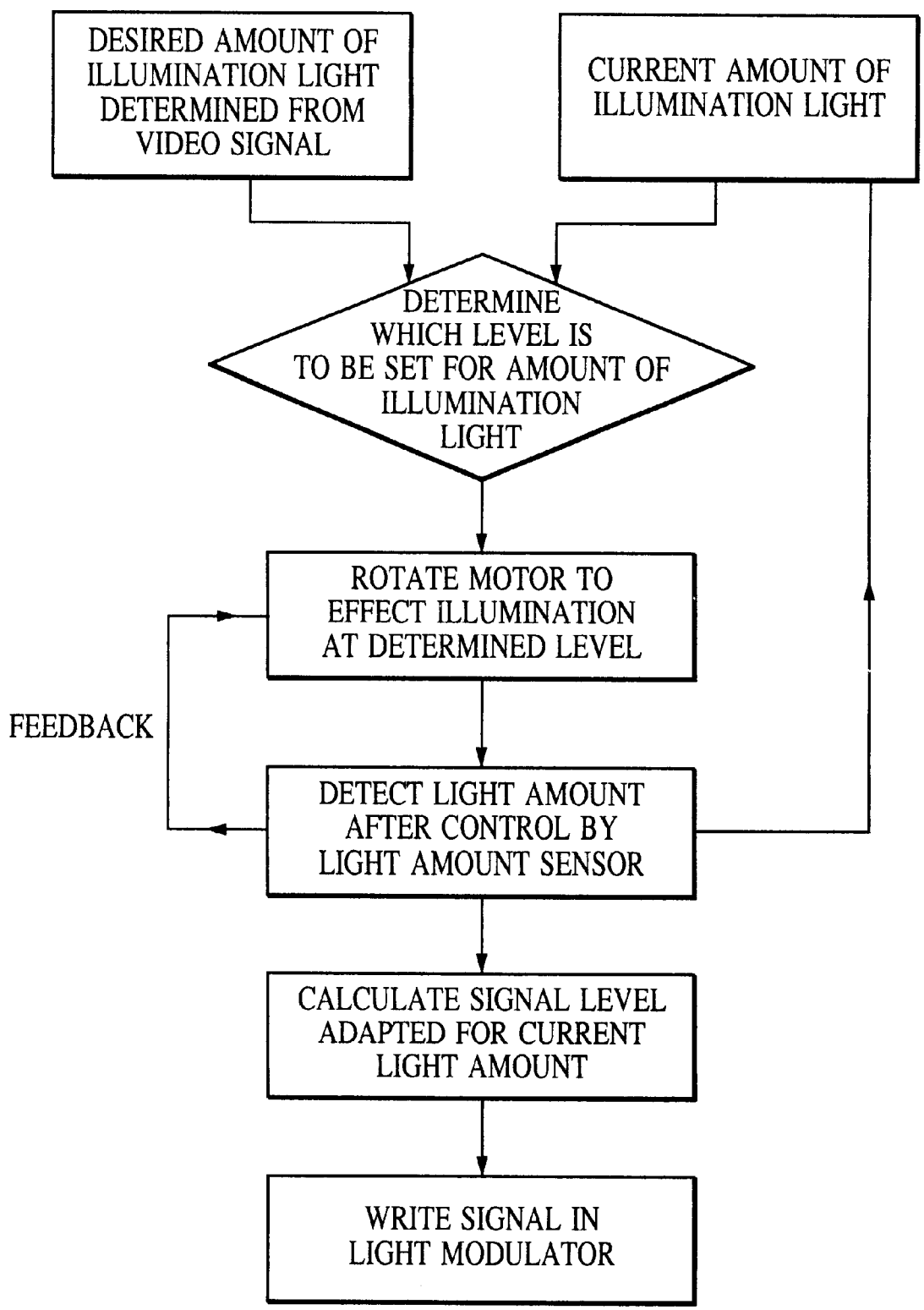
FIG. 3 is a flowchart for explaining the operation of the light amount modulator shown in FIG. 1.

A flowchart of FIG. 3 shows a method of controlling the amount of light illuminated to the liquid crystal panels in the optical system of FIG. 2. Which level is to be set for the amount of illumination light in the next field is determined based on both the amount of illumination light calculated from the video signal and the current amount of illumination light. The reason for considering the current amount of illumination light as well is to be adaptable for even the case that a luminance level is abruptly changed from white to black upon a scene change, for example. Specifically, in such a case, the liquid crystal panels, etc. can be more easily driven and the scene change can be viewed by the human eyes with a less awkward feel by slowly changing the luminance level over several to several tens fields rather than following the quick change of the luminance level.

After the level for the amount of illumination light has been determined, the motor is rotated so as to obtain the determined illumination level. An actual light amount after the control is then measured by the light amount sensor 203. The light amount sensor 203 can be itself constituted by a small-sized PIN-type sensor because the sensor detects the light beam having been narrowed by the condensing lens 202. By combining a small-sized PIN-type sensor with a high-speed amplifier, the light amount can be detected in several tens $\mu$s. By controlling the motor so that the detected light amount is kept at the desired level, even if the amount of light emitted from the lamp itself is changed, it is possible to achieve illumination in constant amount of light and to realize a stable screen image. Particularly, in the case of using an ultrahigh-pressure mercury lamp or a metal halide lamp which has an arc length as short as 1–1.3 mm and is effective in reducing the size of a projector engine, there is a possibility that the amount of light entering the integrator 3 may vary with the movement of the light emitting area of the lamp 2, and the display performance may deteriorate due to fluctuations in the effective amount of light illuminated to the liquid crystal panels. The above-described control method is effective in overcoming such a drawback and advantageous in improving the display performance.

Further, since a signal depending on the actually detected amount of light is calculated and written in the liquid crystal panels, etc., the panels can be driven in such a manner as to vary the amount of illumination light slowly when an image is changed from white to black, and quickly when an image is changed from black to white. This driving method enables the peak luminance of white to be secured when an image is changed from black to white, and hence improves the display performance. Other advantages are that a motor load can be reduced, power consumption can be saved, and a motor life can be prolonged.

In this embodiment, an ultrasonic motor is used to rotate the polarizing plate, and therefore high-speed control for the amount of illumination light is realized as being free from backlash and superior in quietness. Of course, however, any other suitable motor is also usable in addition to an ultrasonic motor.

While in the above-described arrangement the amount of illumination light is controlled by rotating the polarizing plate, a phase plate may be used instead of the polarizing plate. The use of a phase plate reduces a loss of the light amount to almost zero and is more suitable for realizing a high-luminance projector. When a $\lambda/2$ plate is used as the phase plate and the linearly-polarized light beam outgoing from the PS converter 4 is introduced to the $\lambda/2$ plate, the phase of the linearly-polarized light beam having passed the $\lambda/2$ plate is rotated $2\theta$ with a rotation angle $\theta$ of the $\lambda/2$ plate. Accordingly, the rotation angle of the $\lambda/2$ plate is required to be just a half that of the polarizing plate, and therefore the light amount can be modulated at a higher speed. A loss in the amount of the linearly-polarized light beam having been rotated by the $\lambda/2$ plate is only 2–3% that is caused in the phase plate. Thus, the use of a phase plate is also suitable for obtaining higher luminance. The amount of illumination light can be modulated because a polarizing plate is disposed upstream of each liquid crystal panel and only a component of the incident light beam projected in the polarizer-orienting direction of the polarizing plate is illuminated to the liquid crystal panel.

In each of the optical systems shown in FIGS. 1 and 2, the light beam having passed the illumination-light amount modulating optical device (illumination-light amount modulator) 5 is illuminated to the liquid crystal panels for three colors through the relay lenses 6, 24. The dichroic mirror 8 transmits a blue light and reflects light beams of other colors. The dichroic mirror 10 transmits a red light and reflects a green light. In the illustrated embodiment, numeral 16 denotes a liquid crystal panel for blue, 17 denotes a liquid crystal panel for green, and 18 denotes a liquid crystal panel for red. These liquid crystal panels are each, for example, a TN liquid crystal panel driven using TFTs. Further, using a panel including microlenses arranged in a one-to-one relation to pixels is advantageous in reducing a vignetting of light at the aperture and achieving even higher luminance.

Corresponding to the modulation of the amount of illumination light, a novel method is used for driving the liquid crystal panels. The novel driving method will be described later. Respective color light beams, which have been modulated by the liquid crystal panels for three colors, are combined with each other by the cross prism 22 and then projected onto an image screen through the projection lens 23.

(Electrical System)

FIG. 4 is a block diagram of an electrical system used in combination with the optical systems shown in FIGS. 1 and 2. Referring to FIG. 4, numerals 18, 17, 16 denote the liquid crystal panels adapted for display of three colors R, G, B, respectively, and 54 denotes a driver circuit for supplying signals and electrical power to each of the liquid crystal panels. Numeral 55 denotes a DA converter and 56 denotes a memory. The memory 56 stores current display data, data to be displayed in the next frame, etc. Numeral 57 denotes a DSP unit that executes processing for δ-adjustment, conversion from an interlaced signal into a non-interlaced signal, resolution conversion necessary when the number of pixels of the liquid crystal panel used is not in match with that of an input signal, and color adjustment, as well as an arithmetic operation for calculating a signal level for each color in connection with modulation of the illumination light. Numeral 58 denotes a timing generator, and 59 denotes a remote control for turning on or off a power supply and performing various settings. Numeral 60 denotes a control panel for receiving a signal from the remote control 59 and changing over various input signals. Numeral 61 denotes a driver for an ultrasonic motor (USM) for rotating the above-described polarizing plate or phase plate, and 62 denotes the ultrasonic motor. The electrical system further comprises a microcomputer 63 that is connected via a bus to various blocks, such as the memory 56, the DSP unit 57, the timing generator 58, the control panel 60, the USM driver 61, a power supply 66, and a lamp ballast 64, for controlling those blocks. A lamp 65 is connected to the ballast 64. Numeral 67 denotes an A/D converter and 68 denotes a switch. Numeral 69 denotes a signal processing circuit for executing signal processing such as for decoding of an NTSC signal, reduction of noises, band limited filtering, and signal level adjustment. Numeral 71 denotes a PC (Personal Computer) input terminal, and 72 denotes an NTSC input terminal only analog input signals are shown in the block diagram of FIG. 4, but the electrical system is not limited to the illustrated arrangement. As a matter of course, input terminals such as for LVDS and TMDS, a D3-terminal for a digital TV, etc. may also be provided. Numeral 70 denotes a voice circuit amplifier, 73 denotes a speaker, and 74 denotes an AC inlet.

By referring to the electrical block diagram of FIG. 4, a description will be made below of a basic driving operation for modulating the amount of illumination light according to this embodiment (operation for writing a signal in the liquid crystal panel depending on a maximum luminance level that is determined from a video signal).

A signal inputted through the input terminal 71 or 72 is converted into a digital signal by the AD converter 67 and stored in the memory 56. On this occasion, a maximum luminance level in the relevant frame is calculated, and a rotation angle of the polarizing plate or the phase plate, at which the amount of illumination light corresponding to the calculated maximum luminance level is obtained, is calculated. Then, a signal is written in the liquid crystal panel so that a desired level of luminance is realized for each pixel when the illumination light is illuminated in the determined light amount to the panel. A method of calculating the maximum luminance level is described later.

Figure 5A:
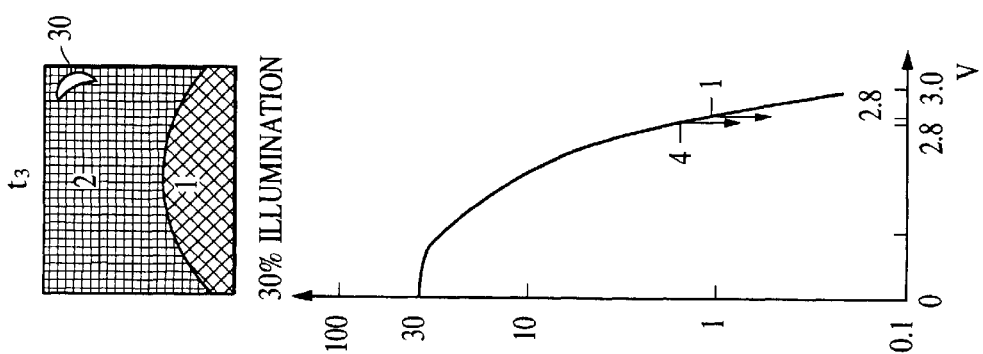
FIGS. 5A, 5B and 5C show examples of display images in the projector of FIG. 1 and the relationship between display gradation and a pixel driving voltage for different amounts of illumination light.
Figure 5B:
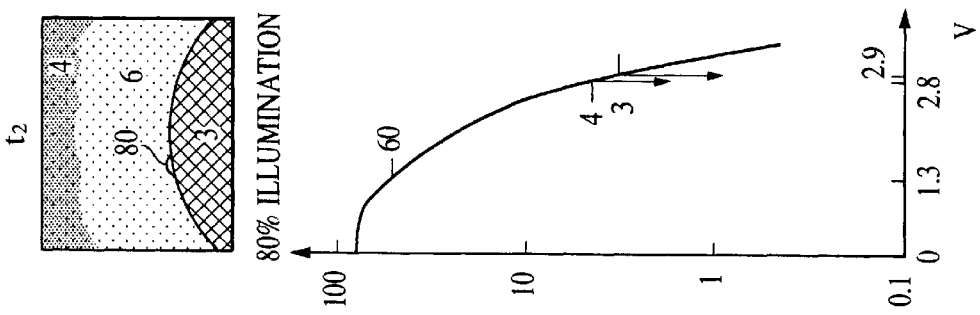
Figure 5C:
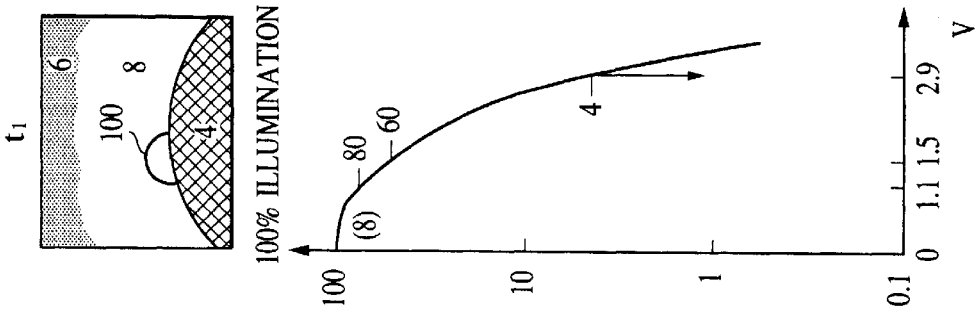

FIGS. 5A, 5B and 5C each show the relationship between a display image and a set driving voltage. FIG. 5A represents an image at the time $t_1$ corresponding to a scene in which the sun begins sinking behind a mountain, and a mountain cove and the sky begin becoming dark. A numerical value in FIG. 5A indicates a luminance level of the image. FIG. 5B represents an image resulted after the lapse of time from the image of FIG. 5A and corresponding to a scene in which the sun has sunk more and the sky has become darker. A peak level in the image of FIG. 5B is 80% of that in the image of FIG. 5A. FIG. 5C represents an image resulted after the lapse of time from the image of FIG. 5B and corresponding to a scene in which night comes and the moon has risen in the sky. The maximum luminance level in the image of FIG. 5C is 30%.

Corresponding to image data, a light of a 100% level is illuminated to the liquid crystal panel for the image of FIG. 5A, a light of a 80% level is illuminated to the liquid crystal panel for the image of FIG. 5B, and a light of a 30% level is illuminated to the liquid crystal panel for the image of FIG. 5C. Graphs in lower areas of FIGS. 5A, 5B and 5C show the relationship (V-T curve) between a voltage applied to the liquid crystal panel and an absolute luminance level in each case. More specifically, in the case of FIG. 5A, 1.1 V is applied to a pixel indicating luminance of a 80% level, 1.5 V is applied to a pixel indicating luminance of a 60% level, and 2.9 V is applied to a pixel indicating luminance of a 4% level. In the case of FIG. 5B, 0 V is applied to a pixel indicating maximum luminance that is at a 80% level, 1.3 V is applied to a pixel indicating luminance of a 60% level, 2.8 V is applied to a pixel indicating luminance of a 4% level, and 2.9 V is applied to a pixel indicating luminance of a 3% level. In the case of FIG. 5C, 0 V is applied to a pixel indicating maximum luminance that is at a 30% level, 2.6 V is applied to a pixel indicating luminance of a 2% level, and 2.8 V is applied to a pixel indicating luminance of a 1% level.

Assuming that each liquid crystal panel has a dynamic range of 200:1, when the light amount of 100% is illuminated, the black level cannot be displayed at a luminance level not higher than 0.5. According to this embodiment, however, a display enable range of the black level is enlarged as the screen image becomes darker as a whole, and hence display of a black image can be realized with a greater depth. When the screen image is bright as a whole, or when there is an influence of the reflected light based on an extraneous light, reproducibility of black is not so noticeable to the human eyes because a recognizable level of the human eyes to slight differences of the black level is reduced. On the other hand, as the scene becomes darker and darker, reproducibility of black becomes more important. This characteristic is in match with the above-described feature of the present invention. In the example described above, the dynamic range is thus essentially improved up to about 660:1.

Next, a description will be made in detail of how the maximum luminance is calculated from a practical image signal, how the desired level for the amount of illumination light is calculated from the calculated maximum luminance data, and how the control of the amount of illumination light is synchronized with signal writing in the liquid crystal panel.

Several examples of the method for calculating the maximum luminance will be described below.

<1> Method of Setting, as Image Maximum Luminance, Maximum Luminance of Pixels in One Field (Frame)

This method is the simplest one for calculating the maximum luminance, and can be implemented by providing comparators for comparing image data stored in the memory and then detecting data having the maximum luminance.

<2> Method of Grouping a Luminance Level Into Multiple Layers and Setting, as Maximum Luminance, an Expected Value in Maximum one of the Grouped Luminance Layers A video signal is usually inputted to the AD converter 67, shown in FIG. 4, with a maximum amplitude of 0.7 Vpp, but it may be sometimes inputted at a level of 120% with respect to 0.7 V. A luminance level is grouped into ten layers with the level of 120% set to a maximum value. Table 1 shows a luminance distribution of image data having luminance levels in a range of 91% to 100% when normalized to 120%.

TABLE 1

| Luminance Level (%) | Number of Pixels among XGX Pixels |
| --- | --- |
| 100 | 20 |
| 99 | 10 |
| 98 | 500 |
| 97 | 600 |
| 96 | 1000 |
| 95 | 2000 |
| 94 | 5000 |
| 93 | 3000 |
| 92 | 2000 |
| 91 | 3000 |

An expected value (average value of the luminance levels) is calculated as 94%. This method is advantageous in reflecting a tendency of the entire data more precisely because an average luminance level within the maximum luminance groups is set to the maximum luminance.

Alternatively, rather than grouping the luminance level with equal intervals, this method may also be effectively implemented by grouping the luminance level so that the numbers of pixels belonging to respective grouped layers are substantially equal to each other, and calculating an expected value of the luminance levels within an uppermost layer.

<3> Method of Setting, as Maximum Luminance, a Threshold Occupying a Desired Percentage of Pixel Area The human eyes have a characteristic that a luminance level is not noticeable unless the luminance level is present, in excess of a certain area. In consideration of such a characteristic, according to this method, pixels are arranged successively in higher luminance order from the highest, and the maximum luminance is determined by a luminance level at which the pixels having luminance not lower than that level reach a desired percentage of the total pixel number of a screen image. For the data shown in Table 1, a luminance level at which the pixels having luminance not lower than that level reaches 2% of the total pixel number is 91%. In this case, the total pixel number is 786,432 and 15,729 pixels correspond to 2% of the total pixel number. Since the number of pixels having luminance levels not lower than 91% is 17,130, the maximum luminance level is 91% when this method is employed.

<4> Method of Dividing Screen Image Into Plural Areas, Calculating Maximum Luminance Values in the Divided Areas by one of Above Methods <1>to <3>, and Setting Maximum one of the Calculated Values as a Maximum Luminance Level When high-luminance pixels are dispersed over a plurality of areas within a screen image in units of small numbers, a maximum luminance level may be apparently increased to a level higher than that perceived by the human eyes. This method is effective in confirming whether high-luminance areas are present in clusters.

As seen from the above description, which one of the maximum luminance calculating methods is the best depends on the video signal. Therefore, the display device of this embodiment is designed to have a mode in which the user can selectively set one of the plural calculating methods, or a mode in which an appropriate one of the plural calculating methods is automatically selected depending on the video signal.

A description will be made below of several examples of determining the amount of light illuminated to the liquid crystal panel based on the maximum luminance level which is determined as described above.

With this method (1), the amount of illumination light is modulated in real time in units of screen image so that the maximum luminance level is obtained. The maximum luminance level is determined by taking data in units of screen image (field or frame) in the memory 56, and then executing arithmetic operations by the DSP unit 57. Accordingly, memory areas comprise an area in which input data is written, a buffer memory area for storing signals which are determined from the calculated maximum luminance and are to be written respectively in the liquid crystal panels 16–18, and a read area used for reading the data out of the buffer memory area successively. The buffer memory area is just required to temporarily store the results of the arithmetic operations, and can be realized line memories for three colors of R, G, B.

The illumination-light amount modulator is controlled so as to provide the desired amount of illumination light in sync with a vertical sync signal that is applied in sync with the input signal. Usually, signal writing in a liquid crystal panel is carried out by raster scan successively from the upper side toward the lower side. However, if the speed of modulating the amount of illumination light is virtually faster than the response speed of a liquid crystal panel, etc., and the amount of illumination light can be modulated in sync with a screen image, the control of the illumination-light amount modulator 5 is not necessarily required to be in sync with the vertical sync signal. In the case that the response speed of a liquid crystal panel is as fast as several ms and synchronization with the modulation of the amount of illumination light is important, it is effective to provide a buffer memory, write signals in all pixels of a TFT liquid crystal panel at a time, and modulate the amount of illumination light in sync with the writing of the signals.

<Method (2) of Determining Amount of Illumination Light>

With this method (2), a mode (period) of modulating the amount of illumination light in real time and a mode (period) of continuously illuminating the amount of illumination light at a 100% level are selectively carried out in accordance with the calculated maximum luminance.

In the case of displaying a screen image in the form of a table using PC data, for example, a practical video signal is represented substantially as a static image and the luminance also remains the same at a 100% level although a part (numerals and letters put in the table) of the image is changed. For such a display image, the above-described function of modulating the amount of illumination light is not so effective even when it is performed during all the period of operation. Therefore, when the luminance level is not lowered below a certain level as compared with a 100% luminance level, the amount of illumination light is continuously set to the 100% level even if the luminance level is, e.g., 95% lower than 100%.

FIG. 6 shows one example of the relationship between a maximum luminance level, which is calculated for image data from the time t=1 to t=10 and a corresponding level for the actual amount of illumination light.

As seen from FIG. 6, a scene is changed between t=4 and t=5 and between t=8 and t=9, and the luminance is abruptly varied upon the scene change. In the example of FIG. 6, 100% illumination is set when the maximum luminance is over 50%, and the amount of illumination light is adjusted depending on the maximum luminance when the maximum luminance is below 50%. Accordingly, the amount of illumination light is changed in accordance with the video signal during only the period from t=5 to t=8. In other words, the period in which the amount of illumination light is changed in accordance with the video signal is restricted to a part of the total usage time of the projector. As a result, lower power consumption and a longer life of the projector were achieved.

This method (2) is also effective in slowly changing the amount of illumination light until reaching an appropriate illumination level when there occurs a change from a bright scene to a dark scene, and in changing the amount of illumination light at a speed faster than that in the above case when there occurs a change from a dark scene to a bright scene.

Such a case is represented in FIG. 7. In FIG. 7, the illumination level at t=5 is set to 70 instead of the maximum luminance level of 30 and the illumination level at t=56 is set to 50 instead of the maximum luminance level of 40 so that the illumination level is adjusted to an actual maximum luminance level over three images. When the brightness changes quickly, processing to detect the contour of an object is executed in the human eyes rather than detecting details of the object. Thus, since the human eyes have a time constant of several to several tens fields (frames), no problems occur in practice even when the amount of illumination light is changed in such a manner. Also, since the amount of illumination light is slowly changed, the motor, etc. are not required to be adapted for high speeds. As a result, a reduction of the cost and a screen image with a less awkward feel are achieved.

On the other hand, for a scene change toward brighter screen images, it is effective to raise the illumination level at a speed at least faster than that upon a change toward a darker scene for the purpose of realizing display of the peak luminance at that time.

As described above, floating of the black level in a gray image is reduced, and reproducibility of a peak is improved when display is changed over from the black level to the white level. Consequently, a narrow dynamic range, which has been a problem with a liquid crystal, etc., can be widened with an added optical device and image processing.

An ultrahigh-pressure mercury lamp, a metal halide lamp, a xenon lamp, a halogen lamp or the like is employed as the lamp for projection display. To achieve a stable light emitting characteristic and a longer life, such a lamp is required to emit a light beam at the desired temperature, under application of constant power, and in constant amount. It can be therefore said that the arrangement of this embodiment is very practically superior in the projection display device.

Second Embodiment

Figure 8:
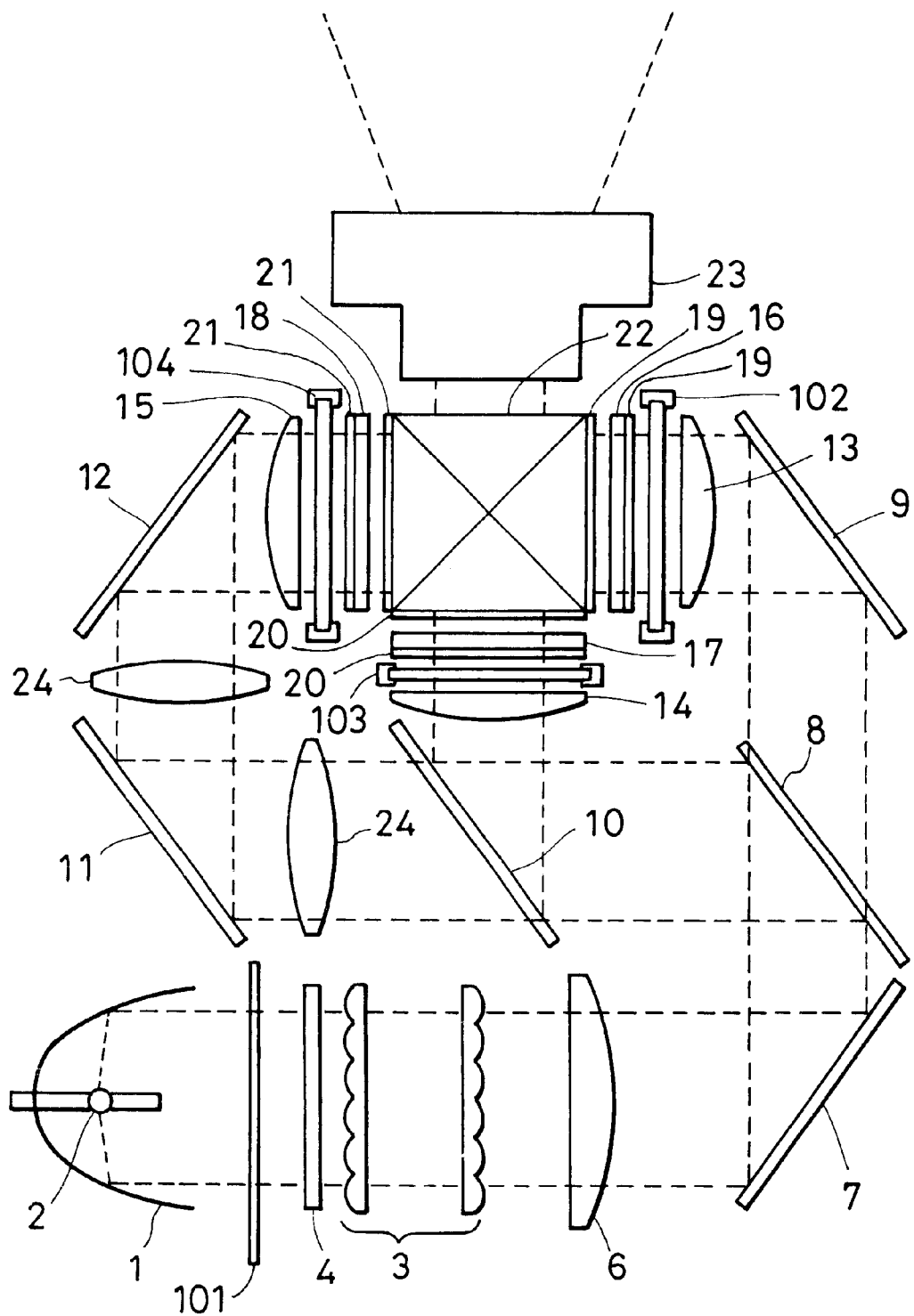
FIG. 8 is a diagram showing the construction of an optical system of a projector according to a second embodiment of the present invention.
Figure 9:
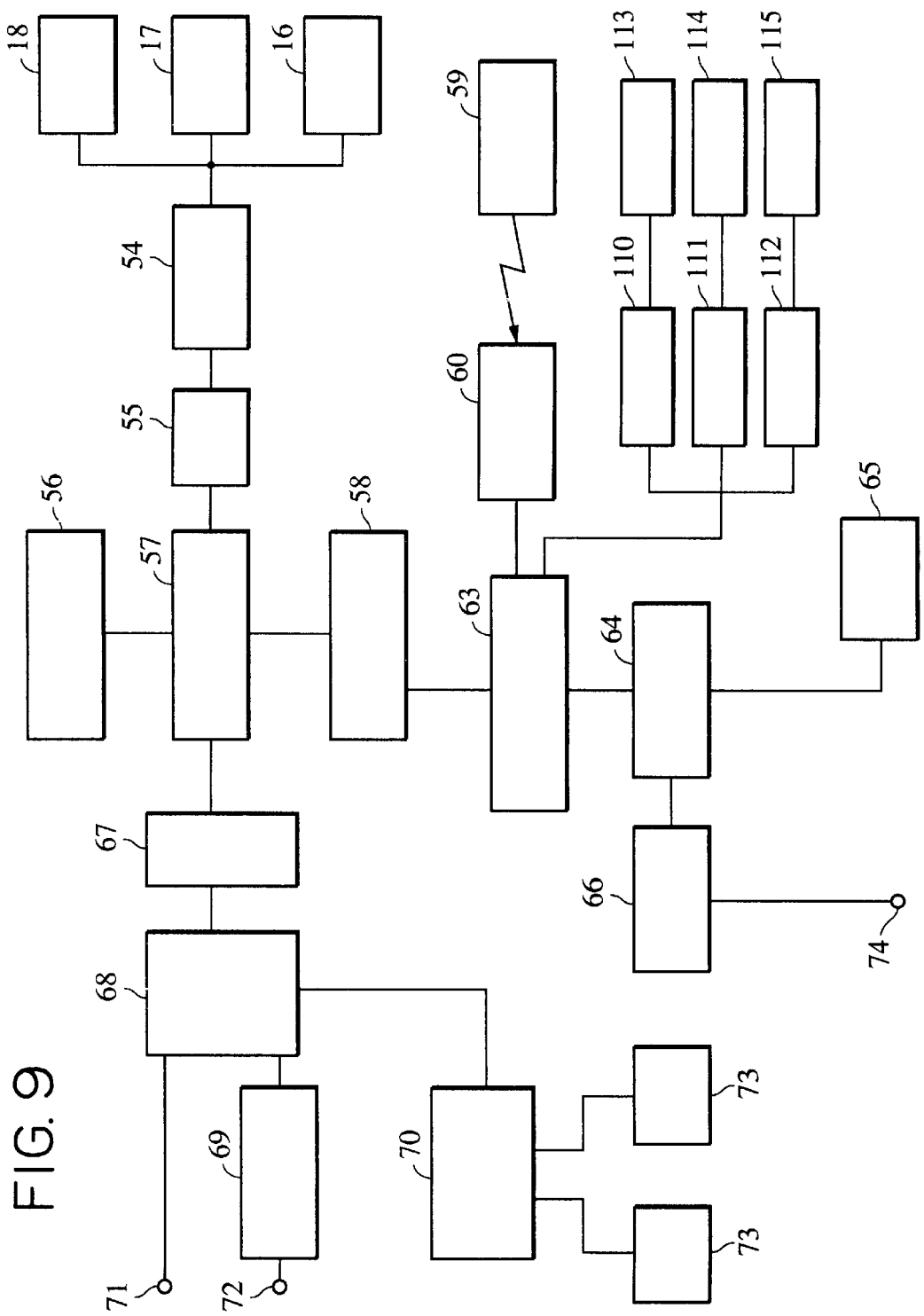
FIG. 9 is a block diagram showing the construction of an electrical system of the projector shown in FIG. 8.

A second embodiment of the present invention will be described below with reference to FIGS. 8 and 9. FIG. 8 shows the construction of an optical system, and FIG. 9 is a block diagram of an electrical system. In FIGS. 8 and 9, devices and blocks having equivalent functions to those in FIGS. 1 and 2 are denoted by the same numerals.

While in the above first embodiment the illumination light emitted from the lamp and modulated in luminance level is illuminated to all of the liquid crystal panels, the amount of illumination light is modulated for each of R, G, B colors in this second embodiment. In FIG. 8, numeral 101 denotes an infrared and ultraviolet cut filter, 102 denotes an R-illumination-light amount modulator, 103 denotes a G-illumination-light amount modulator, and 104 denotes a B-illumination-light amount modulator.

As seen from FIG. 8, polarizing plates are provided on surfaces of the liquid crystal panels 16, 17, 18 of three colors on the incident side of the illumination light, and the illumination-light amount modulators corresponding to the three colors are provided upstream of the polarizing plates in areas of respective light beams separated into the three colors. In FIG. 8, the illumination-light amount modulator are located between the field lenses and the liquid crystal panels.

To modulate the amount of illumination light for each color, ultrasonic motor drivers 110, 111, 112 of R, G, B and corresponding ultrasonic motor 113, 114, 115 are connected as shown in FIG. 9.

The arrangement of this second embodiment is advantageous in representing only one color with high luminance and other colors with medium or low luminance, i.e., in realizing color reproducibility of one particular color and high-luminance display of that color. As a matter of course, the methods for calculating the maximum luminance and determining the amount of illumination light, described above in the first embodiment, can be similarly applied to light beams of R, G, B in this second embodiment.

Third Embodiment

Figure 10:
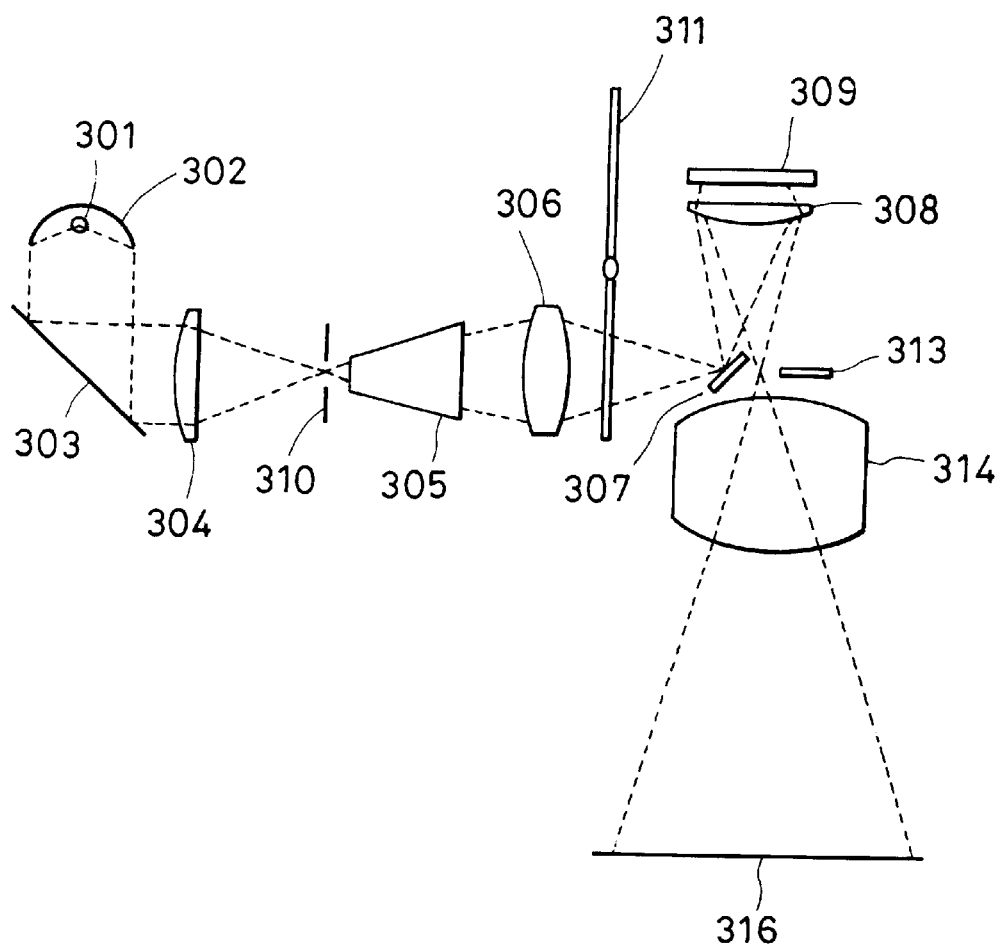
FIG. 10 is a diagram showing the construction of an optical system of a DMD projector according to a third embodiment of the present invention.

FIG. 10 schematically shows a third embodiment of the present invention. Referring to FIG. 10, a light beam emitted from a light source 301, such as a metal halide lamp or a xenon lamp, is reflected by a reflector 302 having a parabolic surface to become a substantially parallel light beam. After being reflected by the mirror 303, the parallel light beam is focused by a condensing lens 304 to form a light source image in the position as a front end surface (first end surface) of an integrator 305. An iris 310 is provided near the light source image. By narrowing the iris 310, the amount of light incident upon the integrator 305 is reduced. Some of the light beam having entered the integrator 305 passes the integrator straightforwardly and the remaining light beam is reflected once or several times by internal reflecting surfaces of the integrator, followed by exiting the integrator from a rear end surface (second end surface).

Figure 11:
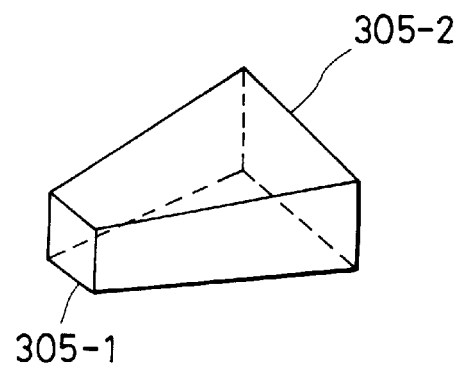
FIG. 11 is an enlarged perspective view showing details of an integrator in FIG. 10.

FIG. 11 shows the shape of a glass rod suitable for the integrator 305 in FIG. 10. The glass rod has a hexahedral outer configuration resulted from cutting the apex of a quadrangular pyramid parallel to the bottom. The glass rod has a front end surface 305-1 which the light beam enters, and a rear end surface 305-2 from which the light beam exits. The rear end surface 305-2 has a greater area than the front end surface 305-1, and both the end surfaces 305-1, 305-2 are interconnected by four tapered side surfaces.

In the integrator shown in FIG. 11, the four side surfaces are all not parallel to the optical axis and have taper angles. However, two, for example, of the four side surfaces may be planes parallel to the optical axis. Both the end surfaces 305-1, 305-2 and the four side surfaces are each polished into an optically smooth surface. The taper angles are selected such that the light beam is totally reflected by the four side surfaces. Of the light beam entering the glass rod, some light entering the front end surface 305-1 vertically or nearly vertically exits the glass rod from the rear end surface 305-2 after being reflected once or several times by the four side surfaces within the glass rod.

Referring to FIG. 10 again, assuming that the focal length of the parabolic reflector 302 is F3 and the focal length of the condensing lens 304 is F4, the parabolic reflector 302 and the condensing lens 304 are preferably selected so as to satisfy a relationship of $4 \leq F4/F3 \leq 10$ (where F3 is the distance from the bottom surface of the parabolic reflector to the above-mentioned focal point). The reason is that such a relationship is effective to form a small light source image in the same position as the front end surface 305-1 of the integrator 305. The light beam outgoing from the integrator 305 enters a convex lens 306, and after passing a dichroic filter which transmits only RGB or RGBW light beams therethrough, it forms an image of the light source 301 near a reflecting mirror 307. The dichroic filter is of the transmission type in the illustrated example, but a reflection-type dichroic filter may be of course used instead. The reflecting mirror 307 is disposed in the same position as an aperture iris 313 of a projecting lens 314.

The light beam outgoing from the integrator 305 is reflected by the reflecting mirror 307 and enters a flat-convex lens 308 for conversion into a substantially parallel light beam. The parallel light beam illuminates a DMD panel 309 serving as an optical modulator. The DMD panel 309 performs optical modulation in such a manner as to scatter or not scatter the incident light for each pixel in accordance with a video signal, thereby producing image information. The liquid crystal display panels of the above-described first and second embodiments may have similar construction and function to those in this embodiment, but another type of liquid crystal display panel is also usable as needed.

An important feature in the optical system of this embodiment is that the rear end surface 305-2 of the integrator 305 is focused on the DMD panel 309 by the convex lens 306 and the flat-convex lens 308. At the rear end surface 305-2 of the integrator 305, a substantially uniform distribution of light intensity free from color variations and luminance variations of the light source is obtained because the light beam having passed the integrator 305 without being reflected within the integrator and the light beam having been reflected once or several times by the side surfaces of the integrator superimpose with each other. By setting the rear end surface 305-2 of the integrator 305 in a conjugate relation to a display surface of the DMD panel 309 through the convex lens 306 and the flat-convex lens 308, therefore, color variations and luminance variations at the display surface of the DMD panel 309 are reduced. It is hence possible to reduce color variations and luminance variations of an image displayed on a screen 315. Further, more efficient illumination of the panel is achieved by setting the rear end surface 305-2 of the integrator 305 to be substantially similar in shape to the display surface of the DMD panel 309 and focusing the rear end surface 305-2 of the integrator 305 on the DMD panel 309 with an appropriate magnification.

While the lenses 304, 306 and 308 are each constituted by a single lens in FIG. 10, these lenses may be each constituted by a plurality of lenses. Likewise, each lens used in the above-described embodiments may comprise a plurality of lenses. Thus, the term "convex lens" used herein means a lens system having positive refracting power.

Light beams of respective colors having been reflected and modulated by the DMD panel 309 in accordance with the video signal are condensed by the flat-convex lens 308. At least parts of the reflected light beams pass an opening of the aperture iris 313 and are then projected onto the screen 315 through a projection lens 314. At this time, a light source image similar in shape to the light source is formed at the opening of the aperture iris 313 by the light beam regularly reflected by the DMD panel 309. This is because the light source 301, the front end surface 305-1 of the integrator 305, the reflecting mirror 307, and the aperture iris 313 are arranged in a conjugate relation to each other. In the optical system comprising the projection lens 314 and the condensing lens 308, the DMD panel side is constituted as a telecentric system.

Figure 12:
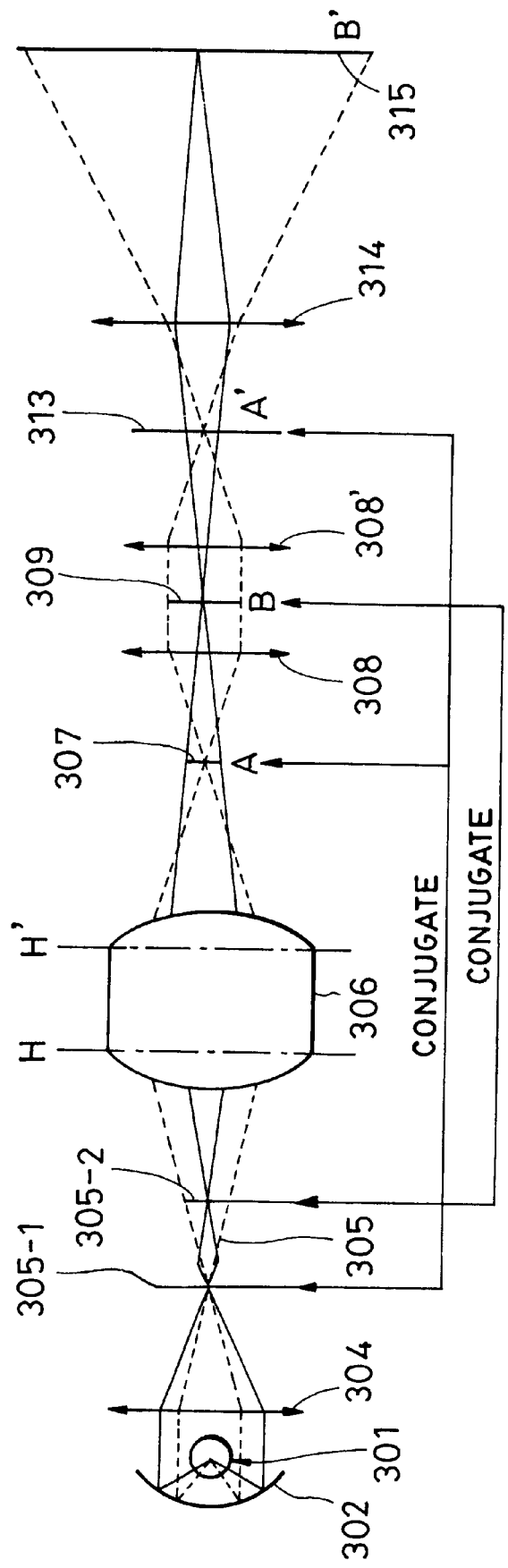
FIG. 12 is a diagram for explaining an optical path of the optical system shown in FIG. 10.

FIG. 12 is a diagram for explaining an optical path of the optical system shown in FIG. 10. Referring to FIG. 12, a light beam emitted from the light source 301 becomes a substantially parallel light beam through the parabolic reflector 302. After being reflected by a mirror (not shown), the parallel light beam forms a light source image on the front end surface 305-1 of the integrator 305 through the condensing lens 304. Some of the light beam having entered the integrator 305 passes the integrator without being reflected within the integrator and the remaining light beam is reflected once or several times by the internal reflecting surfaces of the integrator, followed by exiting the integrator from the rear end surface 305-2.

The light beam outgoing from the integrator 305 enters the convex lens 306, which focuses the outgoing light beam to form a light source image A in the vicinity of the reflecting mirror 307 that is arranged in the same position as the aperture iris 313 of a projecting lens 314 when the optical system is of the reflection type. The light beam having been reflected by the reflecting mirror 307 passes the flat-convex lens 308 and then illuminates the DMD panel 309. The rear end surface 305-2 of the integrator 305 is focused as an image B on the display surface of the DMD panel 309 by the convex lens 306 and the flat-convex lens 308 as described above.

Accordingly, the following advantages are obtained. By arranging an iris for adjusting the light amount in a position not in a conjugate relation to the DMD panel, illumination variations are avoided from occurring on the display surface of the DMD panel. Also, since the light beam is narrowed at the entrance of the integrator and the position A where the light source images are formed in a conjugate relation, an iris having a smaller size can be used when the iris is provided there. Further, an increase in luminance of the lamp raises a possibility that a temperature rise of the optical device may adversely affect other members in the surroundings. By arranging the iris in a position close to the lamp for adjustment of the light amount, the light amount introduced to the downstream side is reduced and the necessity of cooling, particularly, a device area is lessened. As a result, a projector being more cost effective and superior in quietness can be realized.

In this embodiment, RGB light beams are illuminated to the DVD panel in a time-sharing manner by rotating the dichroic mirror 311 shown in FIG. 10. Luminance modulation can be performed similarly to the first embodiment by modulating the iris 310 for adjustment of the light amount in sync with each rotation of the dichroic mirror 311. The amount of illumination light can also be modulated by regulating the iris 310 in sync with a level for each of the time-shared RGB light beams.

The above-described arrangement has an advantage that a DMD having a large dynamic range can be operated with an even larger dynamic range, i.e., higher image quality, through modulation of the amount of illumination light without needing a substantial additional cost.

While this embodiment has been described in connection with a DMD panel as one example, the DMD panel may be of course replaced by a liquid crystal panel.

Figure 13:
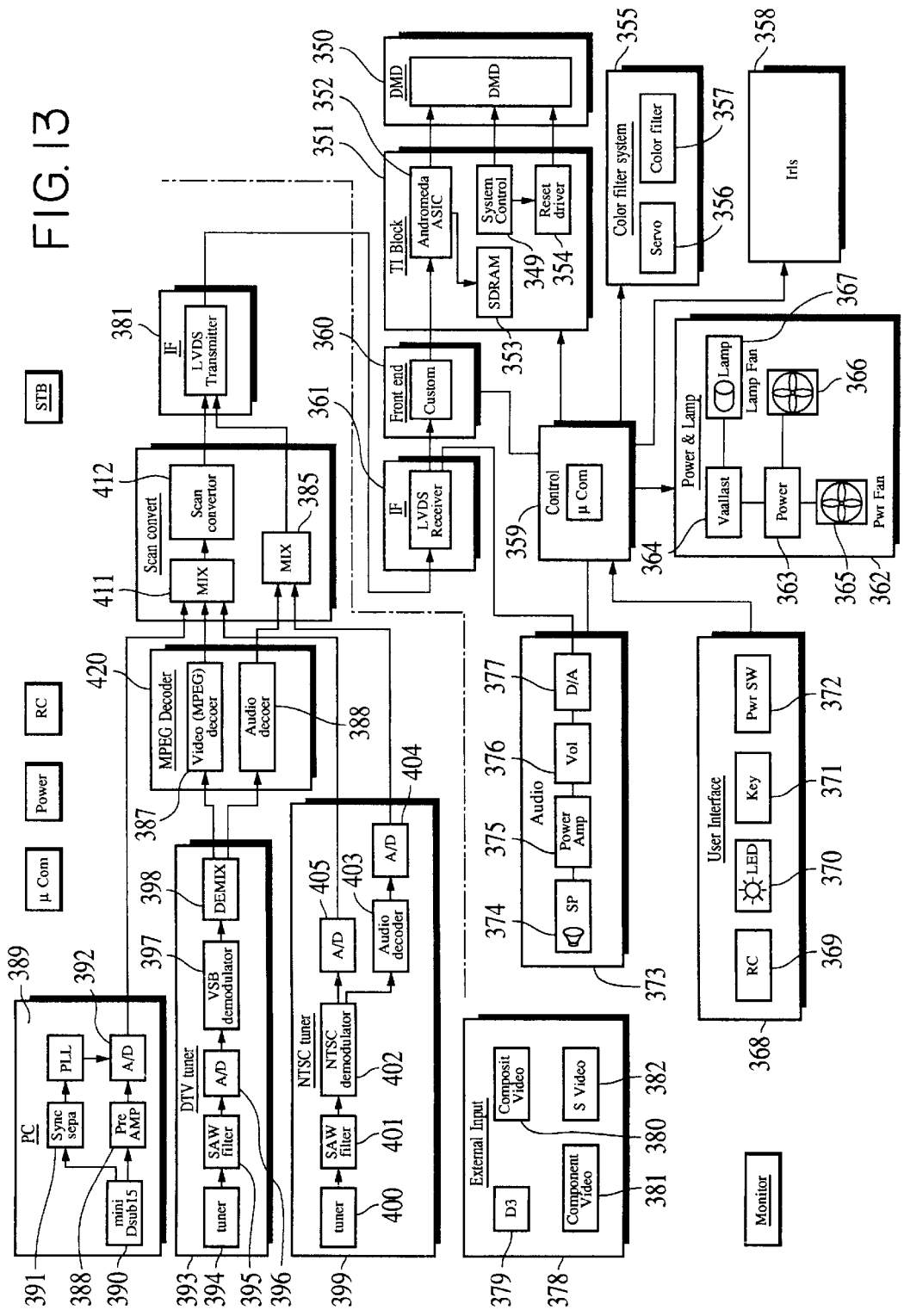
FIG. 13 is a block diagram showing the construction of an electrical system of the DMD projector shown in FIG. 10.

FIG. 13 is a block diagram of an electrical system of the third embodiment. In FIG. 13, numeral 350 denotes a DMD and 351 denotes a DMD driver unit. The DMD driver unit 351 incorporates therein a signal conversion processing unit 352 for time-sharing, etc., a memory 353, a control unit 349, and a reset driver 354.

A color filter system 355 (corresponding to 311 in FIG. 10) is operated in connection with signal processing, and comprises a servo controller 356 including control for synchronization in rotation, and a color filter 357.

An iris 358, a power supply unit 362, and the DMD driver unit 351 are connected to a microcomputer 359 that executes overall control of those components.

The power supply unit 362 comprises a ballast 364, a power supply 363, a lamp 367, a lamp fan 366, and a fan 365 for cooling the power supply and electrical circuit boards. A user interface unit 368 including a remote control and buttons is also connected to the microcomputer 359. The user interface unit 368 comprises a remote control 369, an LED 370 for emitting a light from the remote control 369, a button or key 371, and a switch 372.

An audio system 373 comprises a DA unit 377 for DA-converting an output signal of a digital signal I/F such as LVDS or TMDS, a volume adjusting circuit 376, an amplifier 375, and a speaker 374.

An S-terminal 382, a component video terminal 381, a composite video terminal 380, a digital broadcasting (D3) terminal 379, etc. are provided for the monitoring function.

On the other hand, an analog signal from a PC is inputted through a Dsub 15-pin 390 and is converted into a digital signal by an AD converter 392 after passing both a phase adjuster 391 and a PLL 389 or a preamplifier 388. The digital data is applied to a scan converter 412 through a multiplexer 411.

Further, a DTV signal is applied to the scan converter 412 through a tuner unit 393 and a MPEG decoder 420. In a normal NTSC system, the DTV signal is inputted to the scan converter 412 after being subjected to AD-conversion by an AD converter 405. With such an arrangement, office-oriented front and rear projectors having high image quality can be obtained, and consumer-oriented front and rear TVs, home theaters, mini-theaters, etc. having large-sized image screens can be realized.

In FIG. 13, the DTV tuner unit 393 comprises a tuner 394, a SAW filter 395, an AD converter 396, a VSB demodulator 397, and a demixer 398. An NTSC tuner unit 399 comprises a tuner 400, a SAW filter 401, an NTSC demodulator 402, an audio decoder 403, and AD converters 404, 405.

According to the present invention, as described above, an illumination-light amount modulator is provided between a light source and an optical modulator. Therefore, an image can be displayed with a dynamic range larger than the dynamic range which can be realized by the optical modulator itself, by adjusting both an amount of light illuminated to the optical modulator and display luminance of the optical modulator depending on the maximum luminance calculated from video data.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A projection display device, comprising:
   projection means, including a light source, for projecting an image;
   image display means, including an optical modulator, for displaying an image; and
   illumination-light amount modulating means for adjusting an amount of light illuminated to said optical modulator, said illumination-light amount modulating means being provided between said light source for illuminating said optical modulator and said optical modulator,
   wherein said illumination light amount modulating means comprises a rotating system including a polarizing plate.

2. A projection display device according to claim 1, wherein said optical modulator comprises a liquid crystal panel.

3. A projection display device according to claim 1, further comprising a PS converter for polarizing at least a light beam from said light source, wherein said polarizing plate is disposed downstream of said PS converter.

4. A projection display device according to claim 1, wherein said rotating system is controlled in accordance with a signal calculated from input image data.

5. A projection display device according to claim 1, wherein said rotating system comprises a motor and an encoder.

6. A projection display device according to claim 5, wherein said motor of said rotating system is controlled so that output data of a light amount sensor for detecting the amount of light illuminated to said optical modulator is equal to a desired value corresponding to a signal calculated from the input image data.

7. A projection display device according to claim 2, further comprising a PS converter for polarizing at least a light beam from said light source, wherein said polarizing plate is disposed downstream of said PS converter.

8. A projection display device according to claim 2, wherein said rotating system is controlled in accordance with a signal calculated from input image data.

9. A projection display device according to claim 2, wherein said rotating system comprises a motor and an encoder.

10. A projection display device according to claim 9, wherein said motor of said rotating system is controlled so that output data of a light amount sensor for detecting the amount of light illuminated to said optical modulator is equal to a desired value corresponding to a signal calculated from the input image data.

11. A projection display device, comprising:
    projection means including a light source, for projecting an image;
    image display means, including an optical modulator, for displaying an image; and
    illumination-light amount modulating means for adjusting an amount of light illuminated to said optical modulator, said illumination-light amount modulating means being provided between said light source for illuminating said optical modulator and said optical modulator,
    wherein said illumination-light amount modulating means comprises a rotating system including a phase plate.

12. A projection display device according to claim 11, further comprising a PS converter for polarizing at least a light beam from said light source, wherein said phase plate is disposed downstream of said PS converter.

13. A projection display device according to claim 11, wherein said rotating system is controlled in accordance with a signal calculated from input image data.

14. A projection display device according to claim 11, wherein said rotating system comprises a motor and an encoder.

15. A projection display device according to claim 14, wherein said motor of said rotating system is controlled so that output data of a light amount sensor for detecting the amount of light illuminated to said optical modulator is equal to a desired value corresponding to a signal calculated from the input image data.

16. A projection display device according to claim 11, wherein said optical modulator comprises a liquid crystal panel.

17. A projection display device according to claim 16, further comprising a PS converter for polarizing at least a light beam from said light source, wherein said phase plate is disposed downstream of said PS converter.

18. A projection display device according to claim 16, wherein said rotating system is controlled in accordance with a signal calculated from input image data.

19. A projection display device according to claim 16, wherein said rotating system comprises a motor and an encoder.

20. A projection display device according to claim 19, wherein said motor of said rotating system is controlled so that output data of a light amount sensor for detecting the amount of light illuminated to said optical modulator is equal to a desired value corresponding to a signal calculated from the input image data.

21. A projection display device, comprising:
    projection means, including a light source, for projecting an image;

image display means, including an optical modulator, for displaying an image; and illumination-light amount modulating means for adjusting an amount of light illuminated to said optical modulator, said illumination-light amount modulating means being provided between said light source for illuminating said optical modulator and said optical modulator, wherein said illumination-light amount modulating means comprises an iris and a stepping motor, and wherein said iris has an aperture controlled in accordance with a signal calculated from input image data.

22. A projection display device according to claim 21, wherein said optical modulator comprises a DMD.

23. A projection display device according to claim 21, wherein said iris is disposed in a position not in a conjugate relation to said optical modulator.

24. A projection display device according to claim 21, wherein said optical modulator comprises a liquid crystal panel.

25. A projection display device according to claim 21, wherein said optical modulator comprises a DMD.

26. A projection display device, comprising:

projection means, including a light source, for projecting an image;

image display means, including an optical modulator, for displaying an image; and illumination-light amount modulating means for adjusting an amount of light illuminated to said optical modulator, said illumination-light amount modulating means being provided between said light source for illuminating said optical modulator and said optical modulator, wherein said illumination-light amount modulating means comprises an iris and a stepping motor, and wherein said motor is controlled so that detection data of the amount of light illuminated to said optical modulator is equal to a desired value corresponding to a signal calculated from the input image data.

27. A projection display device according to claim 26, wherein said optical modulator comprises a liquid crystal panel.

28. A projection display device according to claim 26, wherein said optical modulator comprises a DMD.

29. A projection display device according to claim 26, wherein said iris is disposed in a position not in a conjugate relation to said optical modulator.

30. A projection display system comprising:

projection means, including a light source, for projecting an image;

image display means, including an optical modulator, for displaying an image;

illumination-light amount modulating means for adjusting an amount of light illuminated to said optical modulator, said illumination-light amount modulating means being provided between said light source for illuminating said optical modulator and said optical modulator;

luminance-level calculation processing means for calculating a display luminance level from input image data;

illuminating-light amount calculation processing means for calculating an amount of illumination light depending on the calculated luminance level;

illumination-light control processing means for controlling said illumination-light amount modulating means in accordance with the calculated amount of illumination light; and write signal processing means for computing a signal to be written in said optical modulator in accordance with the calculated luminance level and the calculated amount of illumination light.

31. A projection display system according to claim 30, wherein said illumination-light amount calculation processing means calculates, as maximum luminance, a maximum one of luminance values of pixels in each field or frame and calculates the amount of illumination based on the calculated maximum luminance.

32. A projection display system according to claim 30, wherein said illumination-light amount calculation processing means divides luminance levels in each field or frame into n layers, calculates, as maximum luminance, an expected value of the luminance levels within m groups obtained by grouping an uppermost one of the n layers, and calculates the amount of illumination based on the calculated maximum luminance.

33. A projection display according to claim 30, wherein said illumination-light amount calculation processing means selects pixels in each field or frame successively in higher luminance order from the highest, calculates, as maximum luminance, a luminance level at which the number of the selected pixels exceeds a predetermined percentage of the total pixel number, and calculates the amount of illumination based on the calculated maximum luminance.

34. A projection display system according to any one of claims 31 to 33, wherein said illumination-light amount calculation processing means sets said maximum luminance as the amount of illumination light for each field or frame.

35. A projection display system according to claim 34, wherein said illumination-light control processing means changes the amount of illumination light in sync with a vertical sync signal for an image to be displayed.

36. A projection display system according to claim 34, wherein said illumination-light control processing means performs 100% illumination during a period in which the calculated maximum luminance is higher than a predetermined level after taking a 100% level, and changes the amount of illumination light in real time for each field for frame until the calculated maximum luminance restores to the 100% level after being reduced below predetermined level.

37. A projection display system according to claim 36, wherein when said illumination-light control processing means changes the amount of illumination light in real time, said illumination-light control processing means changes the amount of illumination light in sync with the input image data or a vertical in sync signal for an image to be displayed.

38. A projection display system according to claim 37, further comprising light-amount detecting means for detecting an amount of light illuminated to said optical modulator, wherein said illumination-light control processing means changes the amount of illumination light under servo control in accordance with an output of said light-amount detecting means, said illumination-light amount calculation processing means determines a desired amount of illumination light from an input video signal, and said write signal processing means determines, after the amount of actually illuminated light has been measured, a write signal level in accordance with the measured light amount.

39. A projection display device, comprising:

projection means, including a light source, for protecting an image;

image display means, including an optical modulator, for displaying an image;

illumination-light amount modulating means for adjusting an amount of light illuminated to said optical modulator, said illumination-light amount modulating means being provided between said light source for illuminating said optical modulator and said optical modulator; and an optical system for separating colors, wherein said illumination-light amount modulating means is disposed downstream of said optical system, wherein said illumination-light amount modulating means comprises a rotating system including polarizing plate.

40. A projection display device according to claim 39, wherein said optical modulator comprises a liquid crystal panel.

41. A projection display device according to claim 39, further comprising a PS converter for polarizing at least a light beam from said light source, wherein said polarizing plate is disposed downstream of said PS converter.

42. A projection display device, comprising:

projection means, including a light source, for projecting an image;

image display means, including an optical modulator, for displaying an image;

illumination-light amount modulating means for adjusting an amount of light illuminated to said optical modulator, said illumination-light amount modulating means being provided between said light source for illuminating said optical modulator and said optical modulator; and an optical system for separating colors, wherein said illumination-light amount modulating means is disposed downstream of said optical system wherein said illumination-light amount modulating means comprises a rotating system including a phase plate.

43. A projection display device according to claim 42, further comprising a PS converter for polarizing at least a light beam from said light source, wherein said polarizing plate is disposed downstream of said PS converter.

44. A projection display device according to claim 42, wherein said rotating system is controlled in accordance with a signal calculated from input image data.

45. A projection display device according to claim 42, wherein said rotating system comprises a motor and an encoder.

46. A projection display device according to claim 45, wherein said motor of said rotating system is controlled so that output data of a light amount sensor for detecting the amount of light illuminated to said optical modulator is equal to a desired value corresponding to a signal calculated from the input image data.

47. A projection display device, comprising:

projection means, including a light source, for projecting an image;

image display means, including an optical modulator, for displaying an image;

illumination-light amount modulating means for adjusting an amount of light illuminated to said optical modulator, said illumination-light amount modulating means being provided between said light source for illuminating said optical modulator and said optical modulator; and an optical system for separating colors, wherein said illumination-light amount modulating means is disposed downstream of said optical system, wherein said illumination-light amount modulating means comprises an iris and a stepping motor, and wherein said iris has an aperture controlled in accordance with a signal calculated from input image data.

48. A projection display device according to claim 47, wherein said optical modulator comprises a DMD.

49. A projection display device according to claim 47, wherein said iris is disposed in a position not in a conjugate relation to said optical modulator.

50. A projection display device, comprising:

projection means, including a light source, for projecting an image;

image display means, including an optical modulator, for displaying an image; and illumination-light amount modulating means for adjusting an amount of light illuminated to said optical modulator, said illumination-light amount modulating means being provided between said light source for illuminating said optical modulator and said optical modulator; and an optical system for separating colors, wherein said illumination-light amount modulating means is disposed downstream of said optical system, wherein said illumination-light amount modulating means comprises an iris and a stepping motor, and wherein said motor is controlled so that detection data of the amount of light illuminated to said optical modulator is equal to a desired value corresponding to a signal calculated from the input image data.

51. A projection display device according to claim 50, wherein said optical modulator comprises a liquid crystal panel.

52. A projection display device according to claim 50, wherein said optical modulator comprises a DMD.

53. A projection display device according to claim 50, wherein said iris is disposed in a position not in a conjugate relation to said optical modulator.

54. A projection display device according to claim 47, wherein said optical modulator comprises a liquid crystal panel.

55. A projection display device according to claim 42, wherein said optical modulator comprises a liquid crystal panel.

56. A projection display device according to claim 55, further comprising a PS converter for polarizing at least a light beam from said light source, wherein said polarizing plate is disposed downstream of said PS converter.

57. A projection display device according to claim 55, wherein said rotating system is controlled in accordance with a signal calculated from input image data.

58. A projection display device according to claim 55, wherein said rotating system comprises a motor and an encoder.

59. A projection display device according to claim 58, wherein said motor of said rotating system is controlled so that output data of a light amount sensor for detecting the amount of light illuminated to said optical modulator is equal to a desired value corresponding to a signal calculated from the input image data.

* * * * *

UNITED STATES PATENT AND TRADEMARK OFFICE
CERTIFICATE OF CORRECTION

PATENT NO.    : 6,683,657 B1
DATED         : January 27, 2004
INVENTOR(S)   : Mamoru Miyawaki It is certified that error appears in the above-identified patent and that said Letters Patent is hereby corrected as shown below:

Drawings,
FIG. 13, "Video (MPEG) decoer" should read -- Video (MPEG) decoder --, "Audio decoer" should read -- Audio decoder --, "convert" should read -- converter --, "Scan convertor" should read -- Scan converter --, "Composit Video" should read -- Composite Video --, and "Vaallast" should read -- Ballast --.

Column 7,
Line 6, "terminal only" should read -- terminal. Only --.

Column 8,
Line 34, "one" should read -- One --.

Column 9,
Lines 21 and 22, "one" should read -- One --.

Column 18,
Line 41, "field for" should read -- field or --.
Line 50, "in" should be deleted.

Column 19,
Line 33, "system" should read -- system, --.

Signed and Sealed this

Thirteenth Day of July, 2004

JON W. DUDAS
*Acting Director of the United States Patent and Trademark Office*